United States Patent [19]
Yeager

[11] 3,863,897
[45] Feb. 4, 1975

[54] FLOATING CORNER MOUNTED BLOCK
[75] Inventor: David A. Yeager, Belington, W. Va.
[73] Assignee: Jackson Communication Corporation, Clayton, Ohio
[22] Filed: Nov. 15, 1973
[21] Appl. No.: 415,938

[52] U.S. Cl. ......................................... 254/134.3 R
[51] Int. Cl. .............................................. B66d 1/36
[58] Field of Search ............ 254/134.3 R, 134.3 PA, 254/190

[56] References Cited
UNITED STATES PATENTS
| | | | |
|---|---|---|---|
| 1,865,113 | 6/1932 | Kiesel | 254/134.3 R |
| 2,629,768 | 2/1953 | Beil | 254/134.3 R |
| 3,110,479 | 11/1963 | Eitel | 254/134.3 R |
| 3,172,642 | 3/1965 | Eitel | 254/134.3 R |

Primary Examiner—Al Lawrence Smith
Assistant Examiner—Robert C. Watson
Attorney, Agent, or Firm—Biebel, French & Bugg

[57] ABSTRACT

A corner block designed to be mounted at a floating corner where a pair of supporting or messenger strands cross to allow cables being strung to be turned at the intersection of the messenger strands. The corner block includes clamps on the corner block framework for engaging the crossing strands at points spaced slightly from their intersection and a stabilizing brace which engages the corner block intermediate its ends and one of the messenger strands at a point on the opposite side of the intersection of the strands from which the corner block is located.

6 Claims, 4 Drawing Figures

PATENTED FEB 4 1975  3,863,897
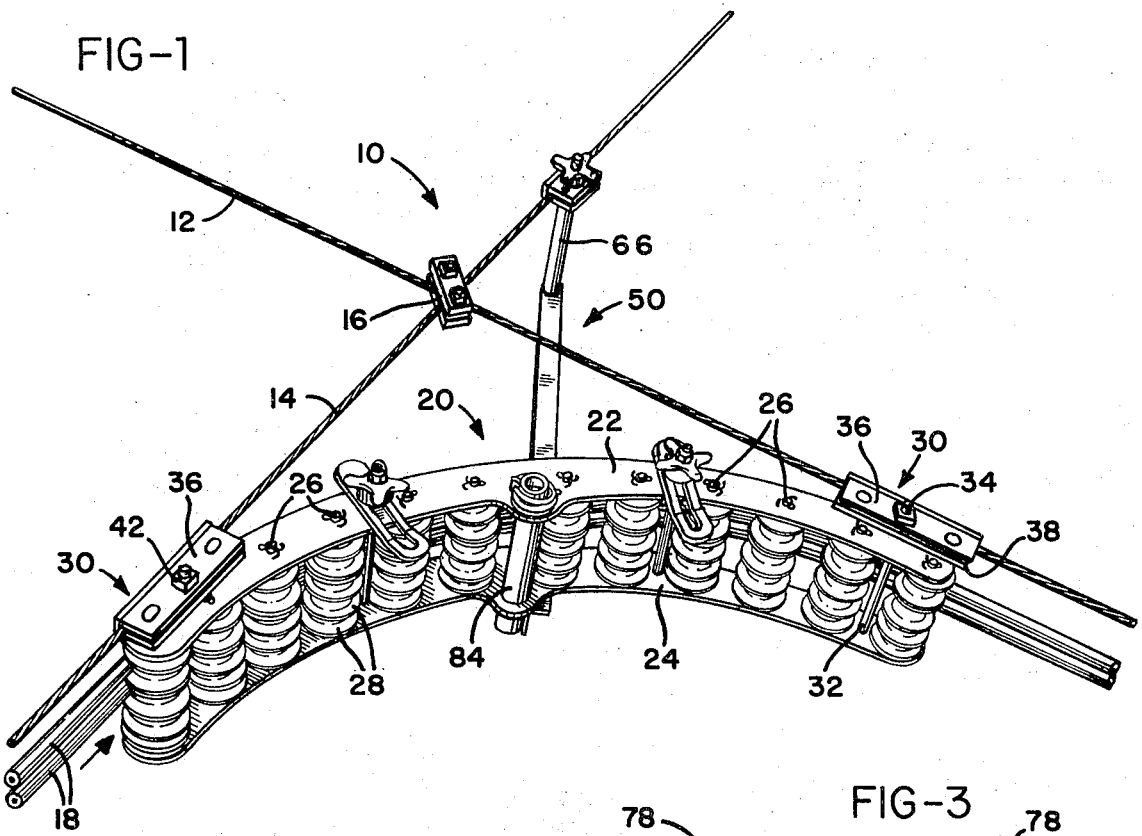
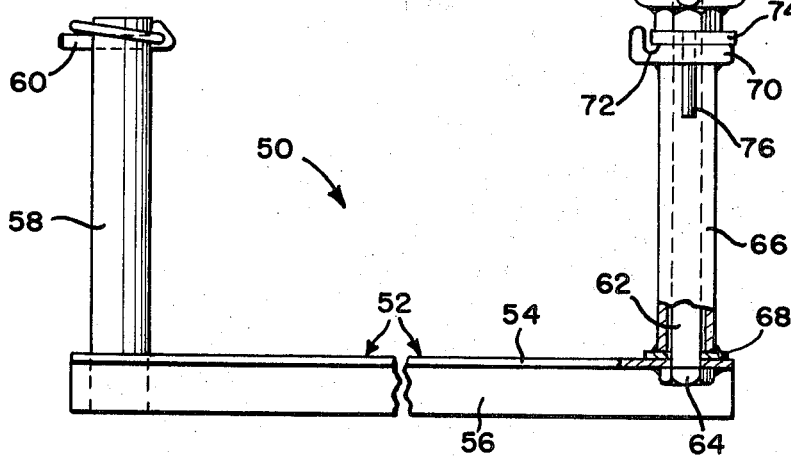
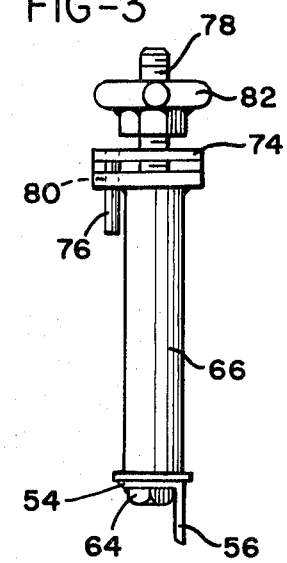
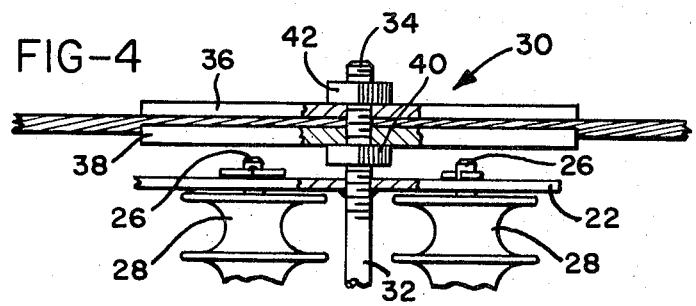

FLOATING CORNER MOUNTED BLOCK

BACKGROUND OF THE INVENTION

In stringing cable it is standard practice to temporarily support several cables beneath an existing messenger strand and thereafter apply a helical lashing of wire to permanently suspend the cables in place. One conventional approach in cable stringing is to lead the cables from a plurality of reels positioned on the ground and pull the cables along the messenger strand with various types of aerial blocks utilized to support temporarily the cables in position beneath the messenger. At points where the direction of the cable line changes a corner block may be utilized to allow the cables to be guided around the pole positioned at that point. For an example of a block utilized in this way reference may be had to U.S. Pat. No. 3,110,479.

In some instances, however, the change in direction does not occur at a supporting pole but may instead occur at a so called "floating corner." A floating corner is one in which two messenger strands cross at a point spaced from supporting poles or other supporting structure.

A number of attempts have been made to simplify the procedure of turning the cables at a floating corner but it would appear that in most cases turning a floating corner involves a great deal of manual handling of the individual cables and various types of jury rigs for temporarily supporting the cables at the corner. Aside from the inefficiency and difficulty involved, when the cables being handled are relatively fragile coaxial cables, there is an added disadvantage of possible cable damage.

Thus, in spite of the obvious lack of an efficient method of turning a floating corner, the need has continued to exist for a method of turning a plurality of cables, such as coaxial cables, smoothly and efficiently without damage to the cables.

SUMMARY OF THE INVENTION

The present invention provides a cable corner block which can be quickly mounted at a floating corner to permit a plurality of cables to be turned simultaneously at a floating corner smoothly and efficiently and without damage to the cables.

The corner block in accordance with the present invention includes an arcuate framework mounting a plurality of sets of rollers with the rollers in each set coaxially mounted and with the cable engaging surfaces of the rollers defining a generally arcuate path.

Clamps are provided on the roller framework adjacent opposite ends of the arcuate path to permit the corner block to be clamped to two intersecting messenger cables on one side of the point of intersection thereof.

A stabilizing brace includes a pivot pin on one end thereof which is rotatably received in a socket in the roller framework intermediate the ends of the arcuate path described above and at its opposite end the stabilizing brace has an upright mounted thereon with a clamp positioned on its upper end.

With this construction the clamp on the upper end of the upright is fixed to one of the messenger cables at a point thereon on the opposite side of the intersection from the roller framework. The pivotal connection between the end of the stabilizing brace and the roller framework allows for some adjustment of the framework along the messenger strands in the area adjacent their intersection.

It will be seen therefore the present invention provides a floating corner cable block which can be quickly installed and is of relatively simple construction, yet provides means for efficiently turning a plurality of cables around a floating corner without damage to the cables and with a minimum of manual handling.

BRIEF DESCRIPTION OF THE DRAWINGS

FIG. 1 is a perspective view of a floating corner mounted block;

FIG. 2 is a side view, with parts in section, of a brace in accordance with the present invention;

FIG. 3 is an end view of the brace of FIG. 2; and

FIG. 4 is a side view, with parts in section, of a framework mounted clamp and associated structure.

DESCRIPTION OF THE PREFERRED EMBODIMENT

Turning initially to FIG. 1 of the drawings it will be seen that a so called "floating corner" 10 occurs where messenger strands or other suspension members 12 and 14 cross and are clamped, as indicated at 16, at their points of crossing or intersection. At such crossing it will often be desired to string cable beneath one of the supporting strands and then direct all or a portion of the cables into position beneath the other crossing strand.

In the example shown in FIG. 1 of the drawings, it may be assumed that a plurality of cables 18 are being towed into position beneath the strand 14 in the direction indicated by the arrow towards the corner 10 and that it is thereafter desirable to direct all of the cables 18 to a position beneath the strand 12 with the cables being towed away from the corner 10.

Of course, it will be appreciated that the cables could be directed in the opposite direction along the strand 12 or that some of the cables could be turned at the intersection while others continued past the intersection beneath the messenger 14. However, for purposes of illustration it will be assumed that it is desired to turn all of the cables 18 at the intersection from the strand 14 to the strand 12.

To accomplish this the floating corner mounted block of the present invention is provided. The block consists of a framework 20 including spaced upper and lower side plates 22 and 24, respectively, with the plates being of generally arcuate construction. Extending between the side plates are a plurality of axles 26, each of which journal a set of rollers 28, the cable engaging surfaces of which define a generally arcuate path convexly disposed with respect to the corner 10.

Adjacent the ends of the arcuate path so defined clamps 30 are mounted on the upper side plate 22. As best seen in FIGS. 1 and 4 of the drawings, the clamps are received on the end of a rod 32 fixed in the side plates 22 and 24 and having a threaded upper end 34 which receives opposed upper and lower clamp plates 36 and 38, respectively. A lower nut 40 is threaded on the upper end of the rod 32 and with an upper nut 42 also threaded on the rod 32 sandwiches the clamp plates 36 and 38 therebetween.

With this construction, as best seen in FIG. 1 of the drawings, the framework and rollers supported thereby may be clamped to a pair of intersecting strands 12 and 14 on one side of the corner 10. The mounting of the clamps on the framework allows some adjustment of the framework adjacent the corner if desired.

To stabilize the framework a stabilizing brace 50 is utilized having, as best seen in FIGS. 2 and 3 of the drawings, an elongated body portion 52 having an upper horizontal flange 54 and a substantially vertical flange 56. Welded to one side of the flange 56 adjacent one end of the body portion 52 is an upstanding pivot pin 58 which may be of tubular construction and provided with a locking pin 60 loosely received in an opening drilled through the upper end of the pivot pin 58.

Adjacent the opposite end of the body portion 52 a bolt 62 has the undersurface of its head 64 welded to the undersurface of the flange 54 and an upstanding post 66 of tubular construction having a washer 68 welded to its lower end is slipped over the upwardly projecting bolt 62.

A lower clamp plate 70 having an opening therethrough to receive the bolt 62 is welded to an upper end of the post 66 and is provided with a strand engaging groove 72. An upper clamp plate 74 having a roll pin 76 press fitted therein is loosely received about the threaded upper end 78 of the bolt 62 with the roll pin 76 received loosely in an opening 80 formed through the lower clamp plate 70.

A knob 82, internally threaded complementarily to the external threads of the bolt 62, is received on the upper end 78 of the bolt and serves to clamp the upper clamp plate 74 downwardly against the lower clamp plate 70 with the roll pin 76 preventing twisting of the upper clamp plate during this operation.

The pivot pin 58 of the brace is received, as best seen in FIG. 1, in a tubular socket 84 extending from the upper to the lower of the side plates 22 and 24. The clamp plates 70 and 74 are then clamped into position on the strand 14 at a point spaced from the roller framework and at a point thereon on the opposite side of the corner 10 from the roller framework. This provides a stable construction for supporting the cables at the floating corner and permits them to be readily trained from one crossing strand to the other with a minimum of manual handling and danger of cable damage.

The construction can be installed at a floating corner readily by simply applying the end clamps 30 to locate the corner block at the desired position. The pivotal connection between the pivot pin 58 and the socket 84 and the rotatable connection between the upstanding post 66 and the bolt 62 then allows the stabilizing brace 50 to be clamped on the cable 14 as necessary to provide the stabilization of the roller framework.

While the form of apparatus herein described constitutes a preferred embodiment of the invention, it is to be understood that the invention is not limited to this precise form of apparatus, and that changes may be made therein without departing from the scope of the invention.

What is claimed is:

1. A corner mounted block adapted to be mounted at the intersection of a pair of crossed messenger strands comprising:
a. a roller supporting framework,
b. a plurality of sets of substantially coaxially mounted rollers rotatably mounted in said framework with cable engaging surfaces of said rollers defining an arcuate cable path,
c. means on said framework adjacent a first end of said arcuate path for engaging one of said crossed messenger strands at a point thereon spaced from the point of crossing of said messenger strands,
d. means on said framework adjacent a second end of said arcuate path for engaging the other of said crossed messenger strands at a point thereon spaced from said point of crossing of said messenger strands,
e. brace means extending between said framework and said one of said messenger strands,
f. means on said brace means for engaging said framework intermediate said ends of said arcuate path, and
g. means on said brace means for engaging said one of said messenger strands at a point thereon spaced from said framework.

2. The block of claim 1 wherein:
a. said brace means is of sufficient length to engage said one of said messenger strands at said point thereon opposite the side of said intersection at which said framework is positioned.

3. The block of claim 1 wherein:
a. said framework has means defining a socket therein intermediate said ends of said arcuate path, and
b. said brace means engages said framework by means of a pivot pin mounted on said brace means and received in said socket means.

4. The block of claim 3 wherein:
a. said brace means includes an elongated body portion, and
b. said pivot pin projects upwardly from said body portion adjacent one end thereof.

5. The block of claim 4 wherein:
a. post means is mounted on said body portion adjacent an end thereof opposite said one end, and
b. said means engaging one of said suspension members comprises a clamp mounted on an upper end of said post means.

6. A floating corner mounted block comprising:
a. a pair of spaced, substantially parallel side plates,
b. a plurality of sets of coaxially mounted rollers received between said side plates on axles extending from an upper one of said side plates to a lower one thereof,
c. clamp means mounted on said upper one of said side plates adjacent opposite ends thereof,
d. means defining a tubular socket extending between said upper and lower side plates,
e. a stabilizing brace having an elongated body portion,
f. a pivot pin mounted on said body portion adjacent one end thereof and projecting substantially perpendicularly therefrom,
g. said pivot pin being pivotally received within said socket,
h. an upstanding post mounted on said body portion adjacent an end thereof opposite said one end and projecting upwardly therefrom in substantially parallel relationship to said pivot pin, and
i. clamp means mounted on an upper end of said post means and adapted to be clamped to a suspension member.

\* \* \* \* \*